(12) United States Patent
Fellenstein et al.

(10) Patent No.: US 7,702,516 B2
(45) Date of Patent: Apr. 20, 2010

(54) PAYMENT CONTROL TO INVENTORS IN PATENT TRACKING SYSTEM

(75) Inventors: Craig William Fellenstein, Brookfield, CT (US); Edward Emile Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1838 days.

(21) Appl. No.: 10/756,136

(22) Filed: Jan. 13, 2004

(65) Prior Publication Data
US 2005/0154673 A1    Jul. 14, 2005

(51) Int. Cl.
*G06Q 40/00* (2006.01)
(52) U.S. Cl. ......................................................... 705/1
(58) Field of Classification Search .................. None
See application file for complete search history.

(56) References Cited

U.S. PATENT DOCUMENTS

| | | | | |
|---|---|---|---|---|
| 5,377,355 | A | 12/1994 | Hagar et al. | 395/650 |
| 5,915,244 | A | 6/1999 | Jack et al. | 705/14 |
| 6,183,362 | B1 | 2/2001 | Boushy | 463/25 |
| 6,553,412 | B1 | 4/2003 | Kloba et al. | 709/219 |
| 6,564,270 | B1 | 5/2003 | Andert et al. | 710/33 |
| 7,127,405 | B1 * | 10/2006 | Frank et al. | 705/1 |
| 2003/0172020 | A1 * | 9/2003 | Davies et al. | 705/36 |
| 2003/0195764 | A1 * | 10/2003 | Baker et al. | 705/1 |
| 2004/0177271 | A1 * | 9/2004 | Arnold et al. | 713/201 |
| 2006/0080135 | A1 * | 4/2006 | Frank et al. | 705/1 |
| 2006/0080136 | A1 * | 4/2006 | Frank et al. | 705/1 |
| 2006/0085219 | A1 * | 4/2006 | Frank et al. | 705/1 |
| 2006/0085220 | A1 * | 4/2006 | Frank et al. | 705/1 |
| 2006/0224412 | A1 * | 10/2006 | Frank et al. | 705/1 |

* cited by examiner

*Primary Examiner*—Olabode Akintola
(74) *Attorney, Agent, or Firm*—Yee & Associates, P.C.; William H. Steinberg; Rudolf O. Siegesmund

(57) ABSTRACT

A method for monitoring payments, payment authorizations, and payable events in an inventor recognition program for a company. The present invention comprises an Award Reminder Program (ARP), an Award Status Program (ASP), and an Award Monitoring Program (AMP). The ARP monitors the award tracking database associated with the present invention and sends the inventor's manager an email requesting authorization of payment when required. If the manager does not authorize payment, the ARP sends the manager a reminder email. If the manager still does not authorize payment, the ARP proceeds up the company's organizational chart until payment is authorized. The ASP monitors the award tracking database and updates the status of each docket in the award tracking database. The AMP allows a user to view the award tracking database, print a payment report, print a payable events report, or send a reminder email to the inventor's manager.

16 Claims, 7 Drawing Sheets

PAYMENT CONTROL TO INVENTORS IN PATENT TRACKING SYSTEM

FIELD OF THE INVENTION

The present invention relates generally to the field of notices and updates for events and specifically to a system for monitoring and updating inventor awards in a company's inventor recognition program.

BACKGROUND OF THE INVENTION

Inventor recognition programs, also known as patent tracking systems, are used by many companies to reward and encourage inventors who conceive of patentable ideas and inventions. While inventor recognition programs are as diverse as companies themselves, there are many aspects of inventor recognition programs which are common to almost every company. For example, an inventor is usually given a financial bonus upon the occurrence of an award event such as the filing of the patent application and issuance of the patent. The inventor may be rewarded when the patent application is published as well. The inventor is also rewarded financially when the company obtains a certain amount of royalties from the patent. These royalty awards are commonly referred to as plateau awards. One example of the royalty levels for plateau awards is a 0.5% commission on the amount of royalty when the total royalty reaches $10,000, $100,000, $1,000,000, and $10,000,000. Persons of ordinary skill in the art are aware of other events which trigger award payments in an inventor recognition program.

One of the problems associated with inventor recognition programs is that the occurrence of award triggering events, authorization of award payments, and actual award payments are difficult to track and update. Tracking these events becomes even more problematic as more inventors, patent applications, patents, and royalties are added to the company's intellectual property portfolio. The existing solutions to the problem have addressed the issue of tracking the patent prosecution and royalties, not the award triggering events, payment authorizations, or payments. Therefore, a need exists for a method of tracking the occurrence of events which trigger an award, the authorization of payment of awards, and the actual payment of awards in a company's inventor recognition system.

Another problem specific to incentive programs like inventor recognition programs is the need to authorize payment of the award. Because it is desirable to have the inventor's manager or supervisor review and approve disbursement of an award payment from payroll, the payment authorization step cannot be removed from the award process. However, there is currently no prior art solution which allows an inventor to check the status of award authorization and, if necessary, send a reminder to the inventor's manager. Therefore, a need exists in the art for a system which allows an inventor to view the status of award triggering events, authorization of award payments, and payment of awards. The need extends to a system which automatically reminds the manager to authorize award payment and also allows the inventor to manually remind his manager to authorize the award payment.

The prior art has previously addressed some of the needs identified above. For example, U.S. Pat. No. 6,183,362 (the '362 patent) entitled "National Customer Recognition System and Method" discloses a customer award tracking system for casinos. The '362 patent tracks the customers' gambling activity at various casinos and grants awards to the customers based on the gambling activity. However, the '362 patent is limited in that it does not disclose a system for tracking payment authorizations or allowing the customers actively participate in the award tracking process.

U.S. Pat. No. 5,915,244 (the '244 patent) entitled "Computerized Incentive Program with Plateau Pricing and Remote Award Redemption" discloses an award tracking system for customers. The '244 patent offers a plurality of products obtainable by redeeming award points. The products are offered at various plateau levels. However, the '244 patent is limited in that it does not disclose a method for tracking the authorization of award payments. The '244 patent also does not disclose a method for allowing the customers to actively participate in the award tracking process.

Consequently, what is needed beyond the prior art is a method and system for tracking award triggering events, award payment authorizations, and award payments. The need extends to a method and system for automatically reminding managers of the need to authorize payment of the awards. Finally, the need includes a method and a system for allowing the inventor to monitor the award triggering events, award payment authorizations, and award payments which also reminds the manager of the need to authorize an award payment.

SUMMARY OF THE INVENTION

The present invention, which meets the needs stated above, is a method for monitoring payments, payment authorizations, and payable events in an inventor recognition program for a company. The software embodiment of the present invention comprises an Award Reminder Program (ARP), an Award Status Program (ASP), and an Award Monitoring Program (AMP). The ARP monitors the award tracking database associated with the present invention and sends the inventor's manager an email requesting authorization of payment when required. If the manager does not authorize payment, the ARP sends the manager a reminder email. If the manager still does not authorize payment, the ARP sends an email to the manager's supervisor requesting authorization of payment. The ARP proceeds up the company's organizational chart until payment is authorized.

The ASP monitors the award tracking database associated with the present invention and updates the status of each docket in the award tracking database. When a payable event occurs, but payment has not been authorized, the status flag is updated to yellow. When a reminder has been sent to the manager or a supervisor, the status flag is updated to red. When a payment is authorized, the status flag is updated to green. The AMP allows a user to view the award tracking database, print a payment report, print a payable events report, or send a reminder email to the inventor's manager. The payable events report summarizes all of the payable events. The payment report summarizes all payments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "associated with" shall mean a direct correlation between a docket item and an event or message in an award tracking database.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "docket item" shall mean an entry in an award tracking database.

As used herein, the term "event" shall mean a payable event, a payment authorization, or a payment.

As used herein, the term "inventor" shall mean a person who is compensated for conceiving an invention.

As used herein, the term "payable event" shall mean an act, within the context of a patent or patent application, in which an inventor being compensated, such as the filing of a patent application, issuance of a patent, or receipt of patent royalties.

As used herein, the term "payment" shall mean money or other compensation given to an inventor for conceiving an invention.

As used herein, the term "payment authorization" shall mean the act of authorizing payment to an inventor.

Figure 1:
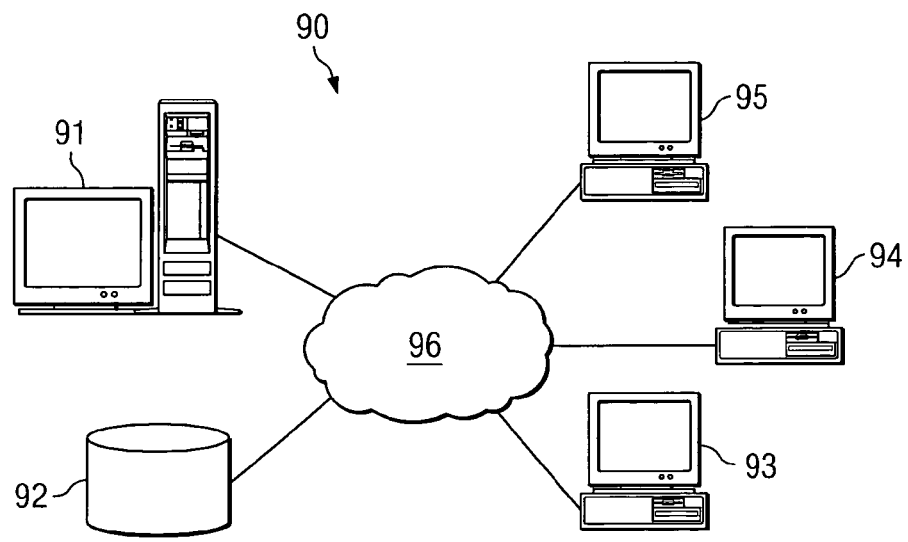
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
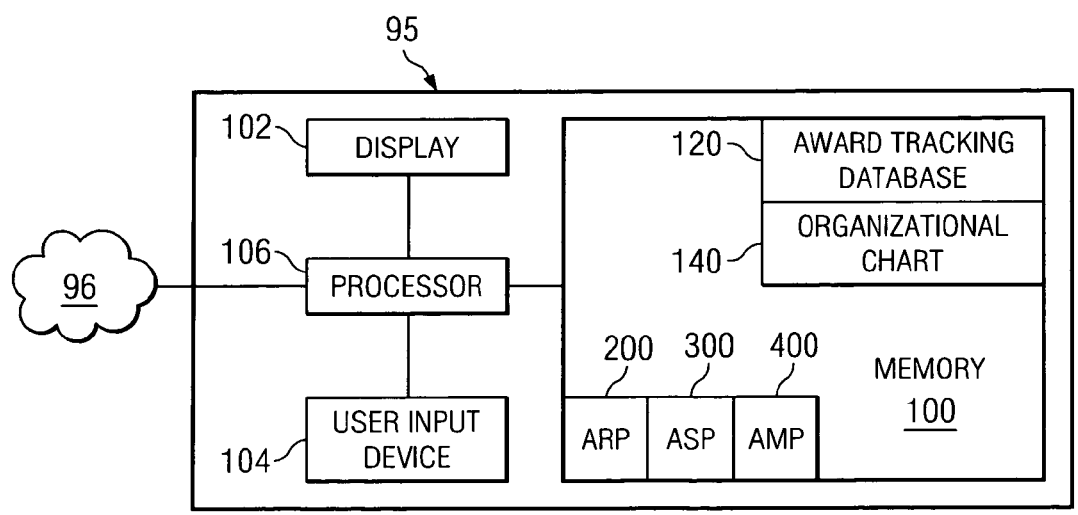
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Award Reminder Program (ARP) 200, Award Status Program (ASP) 300, and Award Monitoring Program (AMP) 400. ARP 200, ASP 300, and AMP 400 described herein can be stored within the memory of any computer depicted in FIG. 1. Alternatively, ARP 200, ASP 300, and/or AMP 400 can be stored in an external storage device such as a removable disk, a CD-ROM, or a USB storage device. Memory 100 is illustrative of the memory within one of the computers of FIG. 1. Memory 100 also contains award tracking database 120 and organizational chart 140. The present invention may interface with award tracking database 120 and organizational chart 140 through memory 100. As part of the present invention, the memory 100 can be configured with ARP 200, ASP 300, and/or AMP 400. Processor 106 can execute the instructions contained in ARP 200, ASP 300, and/or AMP 400. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 86.

In alternative embodiments, ARP 200, ASP 300, and/or AMP 400 can be stored in the memory of other computers. Storing ARP 200, ASP 300, and/or AMP 400 in the memory of other computers allows the processor workload to be distributed across a plurality of processors instead of a single processor. Further configurations of ARP 200, ASP 300, and/or AMP 400 across various memories are known by persons of ordinary skill in the art. The present invention may be a method, a stand alone computer program, or a plug-in to an existing computer program. Persons of ordinary skill in the art are aware of how to configure computer programs, such as those described herein, to plug into an existing computer program.

Figure 3:
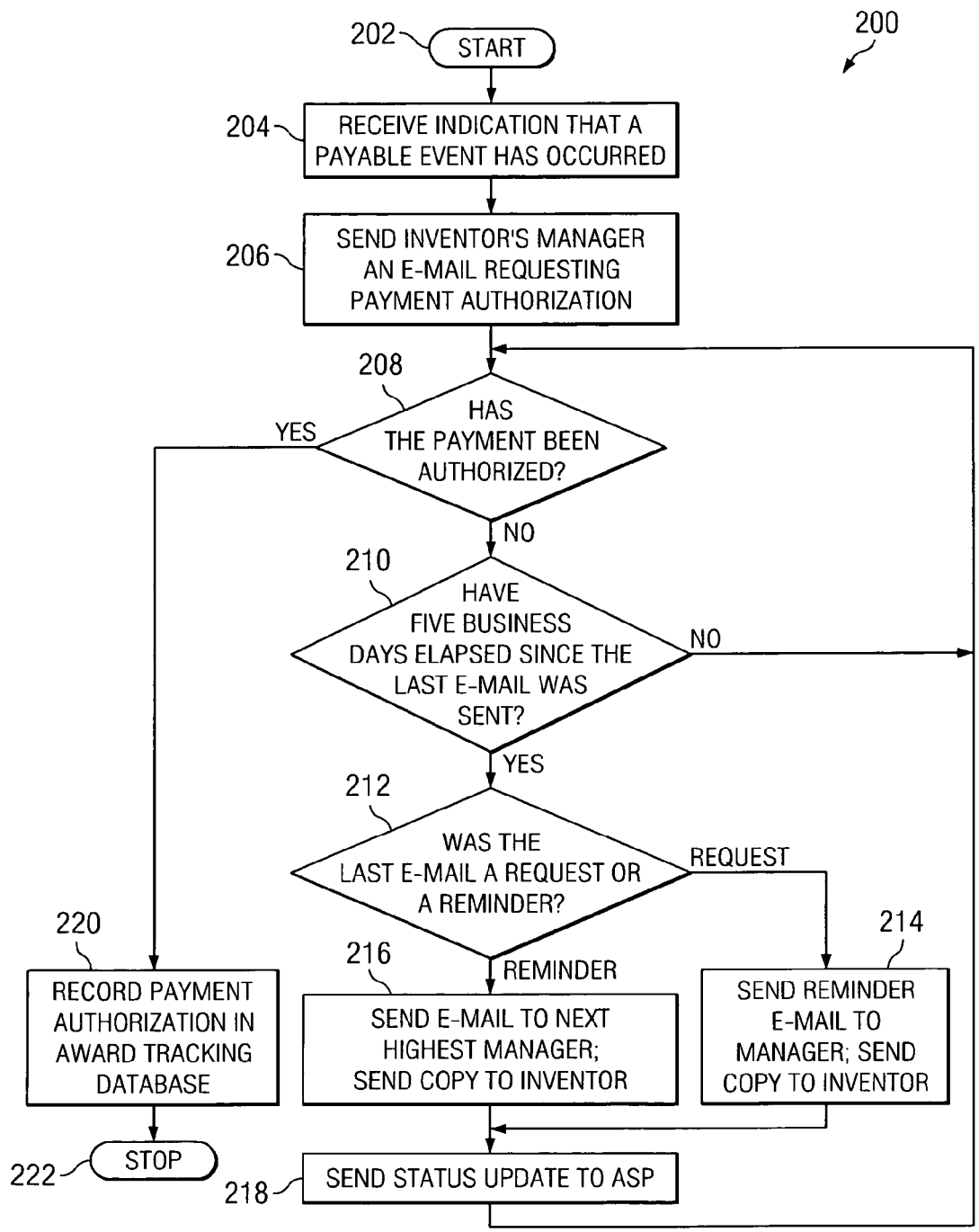
FIG. 3 is an illustration of the logic of the Authorization Reminder Program (ARP) of the present invention.

Turning to FIG. 3, the logic of Award Reminder Program (ARP) 200 is illustrated. ARP 200 is computer program that monitors the occurrence of payable events and reminds management to authorize payment. One application of ARP 200 runs for every payable event. ARP 200 starts (202) whenever ARP 200 receives an indication that a payable event has occurred (204). The indication that a payable event has occurred can come from another computer program or by user entry into the present invention. ARP 200 then sends the inventor's manager an email requesting payment authorization (206). ARP 200 can determine the inventor's manager from the company's organizational chart. The company's organizational chart may be like organizational chart 140 in FIG. 2. The email contains a URL or special action button that allows the manager to authorize the payment directly from the email without having to manually open another application.

ARP 200 then determines whether payment for the award has been authorized (208). ARP 200 can determine if the payment has been authorized by referring to the award tracking database. The award tracking database may be like award tracking database 120 in FIG. 2. If the payment has been authorized, then ARP 200 records the payment authorization in the award tracking database (220) and ends (222). Returning to step 208, if the award has not been authorized, ARP 200 makes a determination whether five business days have elapsed since the last email was sent (210). The five business days are merely to allow the manager time to authorize the payment. A person of ordinary skill in the art may select any other time period, if desired. If five business days have not elapsed, then ARP 200 returns to step 208. If five business days have elapsed, then ARP 200 determines whether the last email was a request for payment authorization or a reminder email (212). If the last email was the original request, ARP 200 sends a reminder email to the inventor's manager and a copy of the email to the inventor (214). If the last email was a reminder email, ARP 200 sends an email to the manager's supervisor, the manager, and sends a copy to the inventor (216). If at step 216 an email has already been sent to the manager's supervisor, ARP 200 sends an email to the next highest supervisor, the manager's supervisor, and the manager, and may proceed up the organizational chart with each iteration of step 216. ARP 200 can determine the next higher manager from the company's organizational chart. ARP 200 then sends a status update to ASP 300 (218) and returns to step 208.

Figure 4:
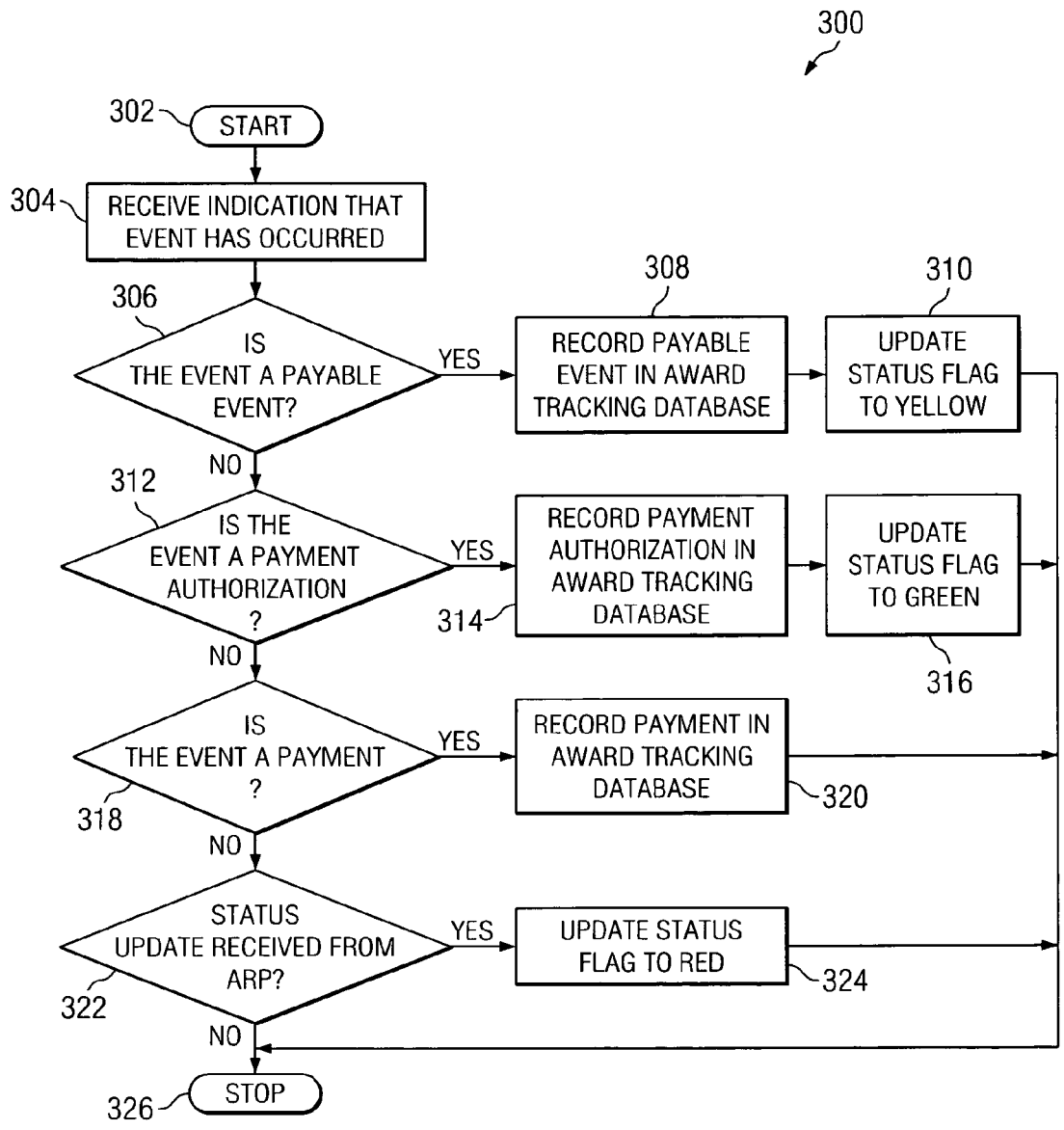
FIG. 4 is an illustration of the logic of the Authorization Status Program (ASP) of the present invention.

Turning to FIG. 4, the logic of Award Status Program (ASP) 300 is illustrated. ASP 300 is a computer program that monitors and updates the status of the payable events, payment authorizations, and payments. ASP 300 starts (302) whenever ASP 300 receives an indication that an event has occurred (304). The event may be a payable event, a payment authorization, or a payment. ASP 300 then determines whether the event is a payable event (306). If the event is not a payable event, ASP 300 proceeds to step 312. If the event is a payable event, ASP 300 records the payable event in the award tracking database (308). ASP 300 then updates the status flag for the docket item to yellow (310) and ends (326). The status flag is an icon in the award tracking database that indicates the status of a particular docket item.

At step 312, ASP 300 determines whether the event is a payment authorization (312). If the event is not a payment authorization, ASP 300 proceeds to step 318. If the event is a payment authorization, ASP 300 records the payment authorization in the award tracking database (314). ASP 300 then updates the status flag for the docket item to green (316) and ends (326). At step 318, ASP 300 determines whether the event is a payment (318). If the event is not a payment, ASP 300 proceeds to step 322. If the event is a payment, ASP 300 records the payment in the award tracking database (320) and ends (326). At step 322, ASP 300 determines whether the event is a status update from ARP 200 (322). If the event is a status update, ASP 300 updates the status flag to red (324) and ends (326). If the event is not a status update, ASP 300 ends (326).

Figure 5:
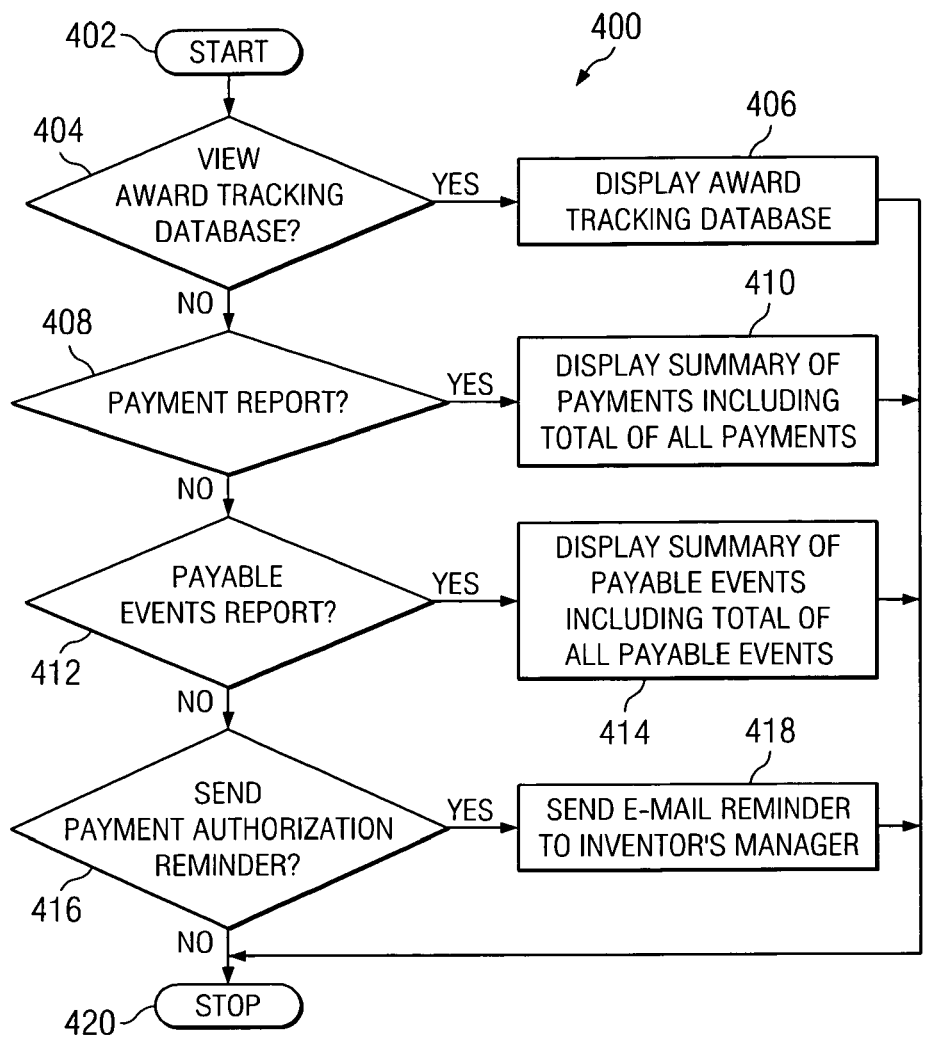
FIG. 5 is an illustration of the logic of the Authorization Monitoring Program (AMP) of the present invention.

Turning to FIG. 5, the logic of Award Monitoring Program (AMP) 400 is illustrated. AMP 400 is a computer program which allows the inventor to monitor his patents and patent applications, view reports summarizing the payment authorizations and payments, and remind his manager to authorize a payment, if necessary. AMP 400 starts (402) when invoked by a user. AMP 400 then makes a determination whether the inventor wants to view the award tracking database (404). If the user does not want to view the award tracking database, the AMP 400 proceeds to step 408. If the user wants to view the award tracking database, AMP 400 displays the award tracking database (406) and ends (420). At step 408, AMP 400 determines if the user wants to view the payment report (408). If the user does not want to view the payment report, AMP 400 proceeds to step 412. If the user wants to view the payment report, AMP 400 displays the summary of the payments including the total of all payments (410) and ends (420).

At step 412, AMP 400 determines if the user wants to view the payable events report (412). If the user does not want to view the payable events report, AMP 400 proceeds to step 416. If the user wants to view the payable events report, AMP 400 displays the summary of the payable events including the total of all payable events (414) and ends (420). At step 416, AMP 400 determines if the user wants to send the inventor's manager an email reminder to authorize payment of an award (416). If the user does not want to send a reminder email, AMP 400 ends (420). If the user does want to send a reminder email, AMP 400 sends the manager a reminder email (418) and ends (420).

Figure 6:
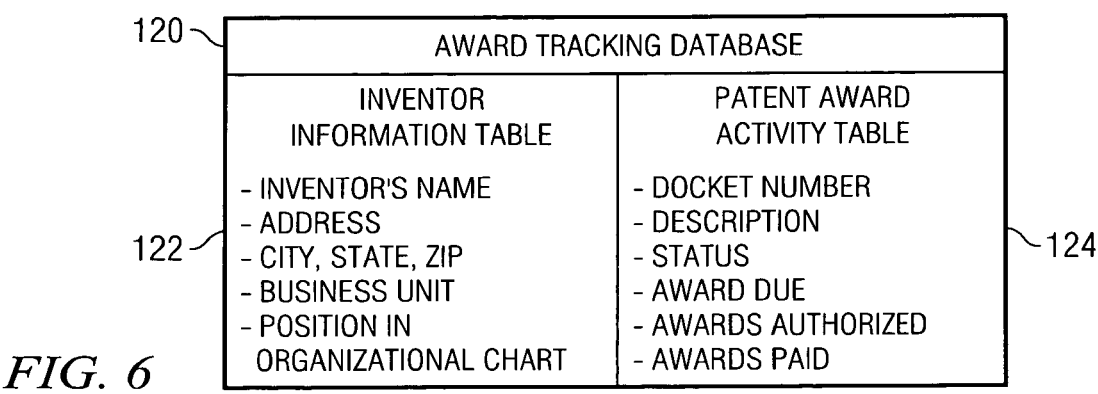
FIG. 6 is an illustration of the award tracking database of the present invention.

Turning to FIG. 6, a graphical depiction of award tracking database 120 is illustrated. Award tracking database 120 comprises a plurality of tables including inventor information table 122 and patent activity award table 124. Inventor information table 122 contains information about the inventor including the inventor's name, address, city, state, zip code, the business unit of the company that the inventor works in, and the inventor's position in the organizational chart. The inventor can modify the information in inventor information table 124 as necessary. For example, the inventor may want to have the patent certificate forms sent to his home address. Patent award activity table 124 contains a list of the dockets for the inventor's patent applications and patents, a description of each invention, the status of each docket, the awards due, the awards authorized, and the awards paid. Patent award activity table 124 may break down the awards due, awards authorized, and awards paid by the payable event, such as filing the patent application, issuance of the patent, royalties received, and so forth.

Figure 7:
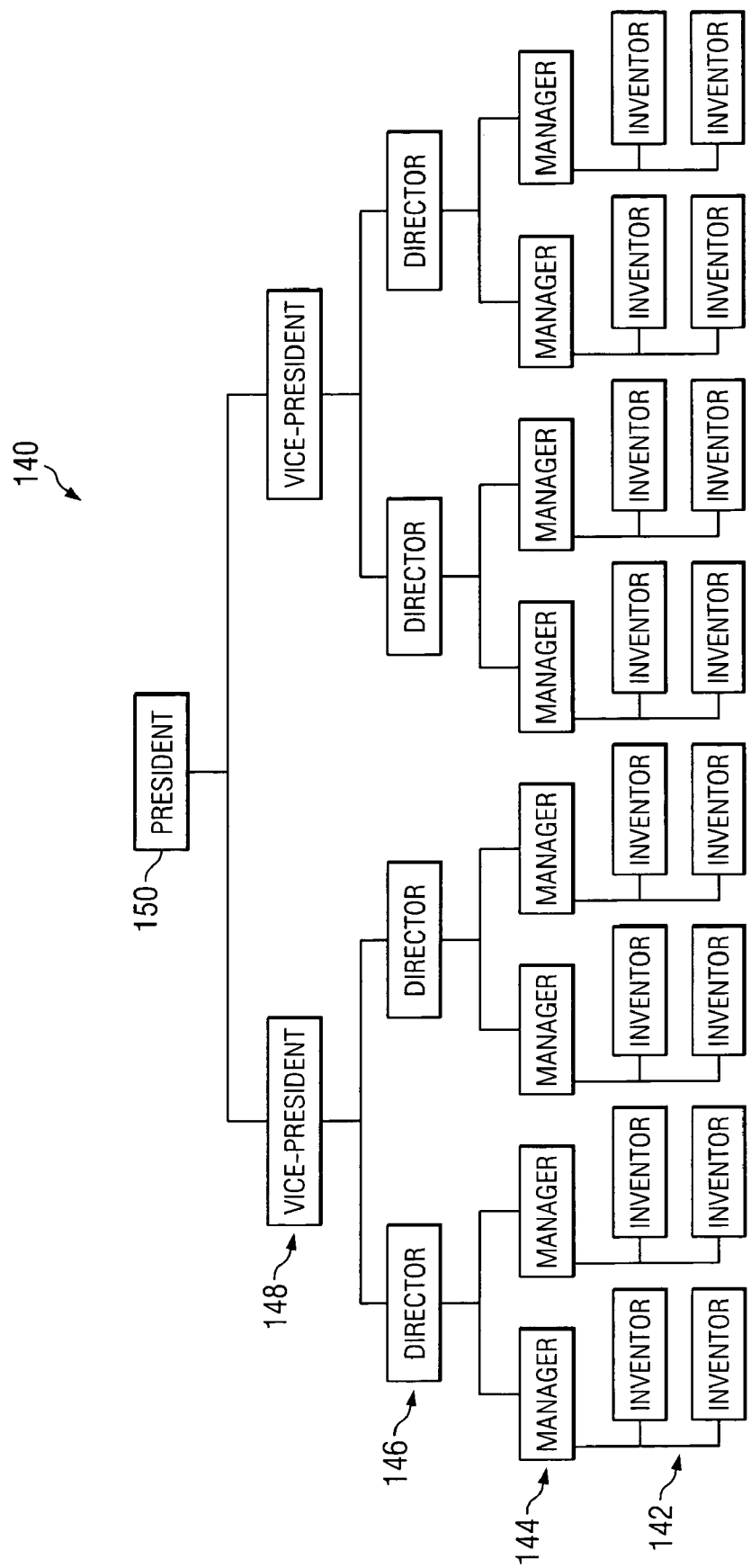
FIG. 7 is an illustration of the organizational chart of the present invention.

Turning to FIG. 7, a graphical depiction of organizational chart 140 is illustrated. Organizational chart 140 is a simplified version of a company's organizational chart. Organizational chart 140 displays the relationship between president 150, vice-presidents 148, director 146, managers 144, and inventors 142. The present invention is able to discern who an individual inventor's manager is through organizational chart 140. Similarly, the present invention can discern the supervisor of any employee of the company through organizational chart 140. Persons of ordinary skill in the art are aware of how organizational chart 140 will vary from company to company.

Figure 8:
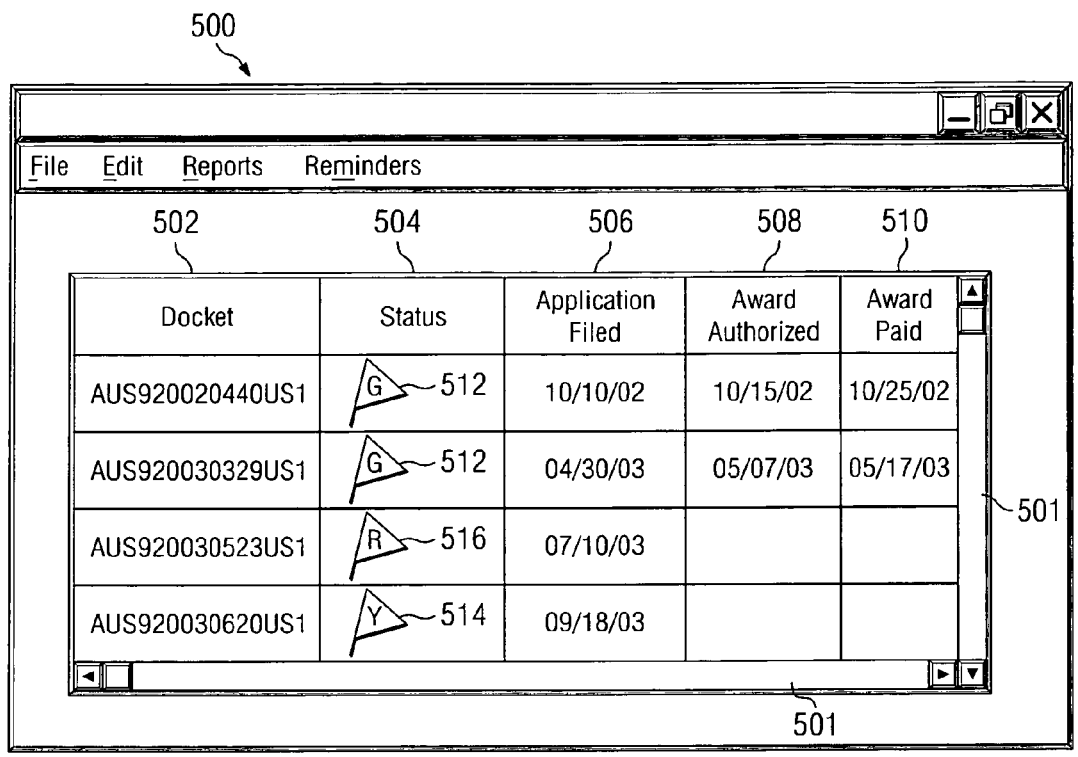
FIG. 8 is an illustration of the Graphical User Interface (GUI) displaying the patent award activity table of the present invention.

Turning to FIG. 8, Graphical User Interface (GUI) 500 is illustrated. GUI 500 allows the user to view award tracking database 120 or reports from AMP 400. GUI 500 in FIG. 8 depicts patent award activity table 124 including docket number 502, status 504, application filing date 506, award authorization date 508, and award paid date 510. The other fields of patent award activity table 124 may be viewed using scroll bars 501. The status of each docket is indicated by red flag 516, yellow flag 514, or green flag 512. Green flag 512 indicates that all awards have been paid. Yellow flag 514 indicates that a payable event has occurred and the inventor's manager has not authorized the payment of the award. Red flag 516 indicates that the manager has been sent at least one reminder regarding authorization of the payment award.

Figure 9:
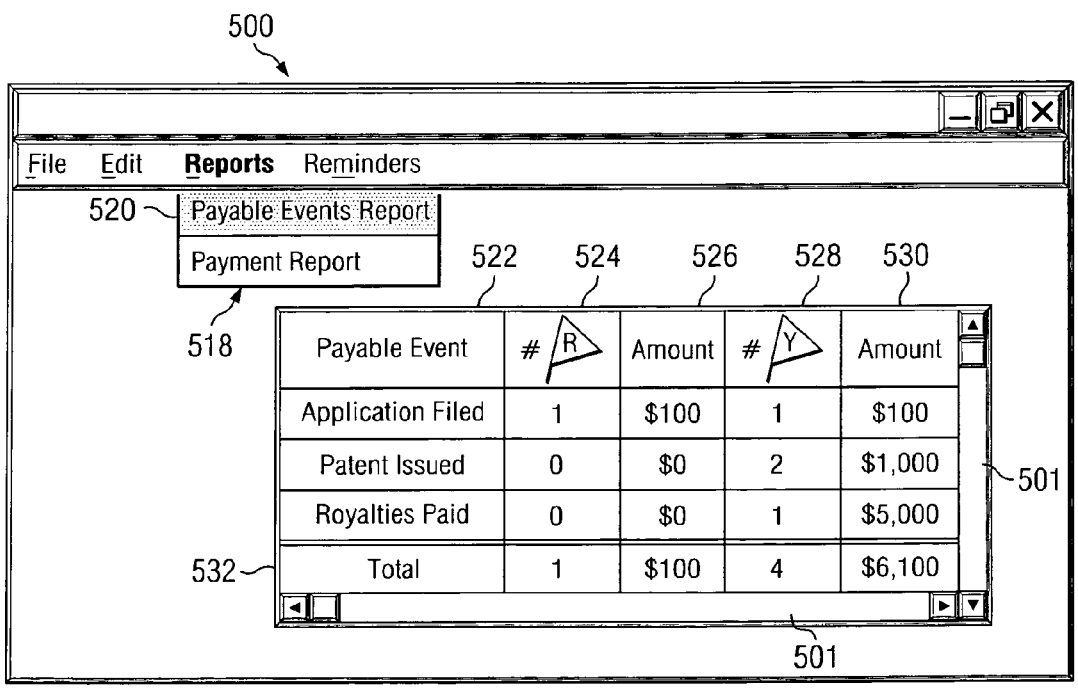
FIG. 9 is an illustration of the GUI displaying the payable event report of the present invention.

Turning to FIG. 9, GUI 500 is illustrated displaying the payable events report. The payable events report is a summary of the payable events which have occurred, but in which payment has not yet occurred. The payable events report may be selected from menu 518 by choosing payable events report option 520. Payable events report comprises payable events 522, number of red flags 524, dollar amount for red flags 526, number of yellow flags 528, and dollar amount for yellow flags 530. Payable events report also comprises the totals 532 for each column. Number of red flags 524 indicates the total number of red flags for the inventor's inventions. Dollar amount for red flags 526 indicates the dollar amount associated with the red flags. Number of yellow flags 528 indicates the total number of yellow flags for the inventor's inventions. Dollar amount for yellow flags 530 indicates the dollar amount associated with the yellow flags. Payable events report may also comprise any payable events information deemed necessary by a person of ordinary skill in the art.

Figure 10:
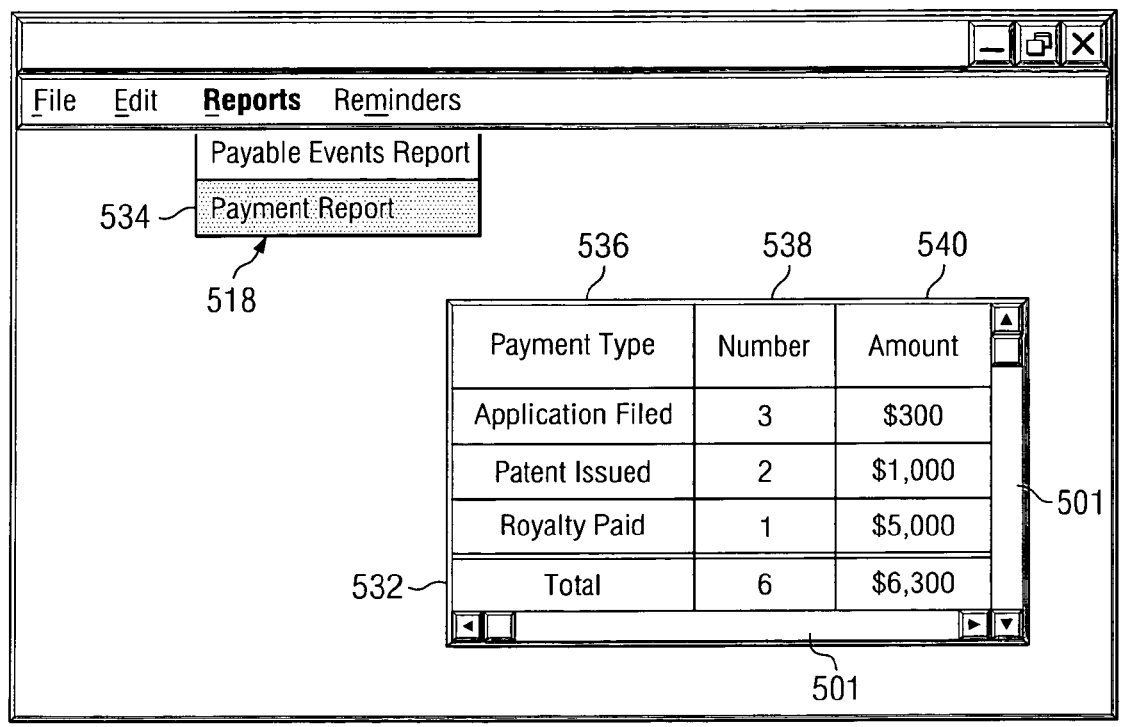
FIG. 10 is an illustration of the GUI displaying the payment report of the present invention.

Turning to FIG. 10, GUI 500 is illustrated displaying the payment report. The payment report is a summary of the payments made to the inventor for his inventions. The payment report may be selected from menu 518 by selecting payment report option 534. The payment report comprises payment type 536, number of payments 538, and amount of payments 540. Payable events report also comprises the totals 532 for each column. Payment type 536 is a description of what the payment is for. Number of payments 538 is a quantitative measure of the number of payments. Amount of payments 540 is a measure of the total amount of the payments. Payment report may also comprise any payment information deemed necessary by a person of ordinary skill in the art.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A computer-implemented method for monitoring a company inventor recognition program, the computer-implemented method comprising:
    accessing, by a processor, an award tracking database containing a plurality of information about an inventor, the inventor's position in an organizational chart, a list of dockets for patent applications and patents of the inventor, a list of payable events, wherein the inventor is to receive a payment for each of the payable events, and an indication when the payment to the inventor has been authorized by a manager;
    responsive to finding, by the processor, an indication that a payable event has occurred but no indication that the payment has been authorized, sending, by the processor, the manager a message requesting an authorization for the payment;
    responsive to sending the manager the message, and responsive to a first determination that a first time period has elapsed since the email was sent to the manager, determining, by the processor, whether the indication that the payment has been authorized is present in the award tracking database;
    responsive to a second determination, by the processor, that the indication that the payment has been authorized by the manager is not present in the awards tracking database, updating, by the processor, a status of a docket item associated with the payment in the awards database and sending, by the processor, the manager an email adapted to allow the manager to authorize the payment directly from the email without the manager having to manually open another application.

2. The computer-implemented method of claim 1, further comprising:
    responsive to a third determination, by the processor, that the payment has been authorized, recording the payment authorization in the award tracking database.

3. The computer-implemented method of claim 1, wherein the steps prior to updating the status of the docket item associated with the message further comprise:
    responsive to a fourth determination, by the processor, that a third time period has passed since the email was sent to the manager, determining, by the processor, whether a message in the email was a request message or a reminder message; and
    responsive to the determination that the message was a request message, sending the reminder message, by the processor, to the manager.

4. The computer-implemented method of claim 3, further comprising:
    responsive to the determination that the message was the reminder message, sending the reminder message, by the processor, to a next highest supervisor in an organizational chart.

5. The computer-implemented method of claim 1, wherein the time period is five days.

6. The computer-implemented method of claim 1, wherein the payable event is associated with a patent or a patent application.

7. A computer-implemented method for updating the status of a docket item in an inventor recognition program comprising:
    accessing, by a processor, an award tracking database containing a plurality of information about an inventor, the inventor's position in an organizational chart, a list of dockets for patent applications and patents of the inventor, a list of payable events for which the inventor is to receive a payment, and an indication when a payment to the inventor has been authorized by a manager;
    responsive to finding an indication that a payable event has occurred but no indication that the payment has been authorized, sending, by the processor, the manager a message requesting an authorization for the payment;
    responsive to sending the manager the message, and responsive to a first determination that a first time period has elapsed since the email was sent to the manager, determining, by the processor, whether the indication that the payment has been authorized is present in the award tracking database; and
    responsive to a second determination that the indication that the payment has been authorized by the manager is not present in the awards tracking database, updating, by the processor, a status flag of a docket item associated with the payment in the awards database to a first color and sending the manager, by the processor, an email adapted to allow the manager to authorize the payment directly from the email without the manager having to manually open another application.

8. The computer-implemented method of claim 7, further comprising:
    determining, by the processor, when the payment authorization has been made; and
    responsive to a third determination that the payment authorization has been made, recording, by the processor, the payment authorization in the award tracking database and updating the status flag to a second color.

9. The computer-implemented method of claim 7, further comprising:
    determining, by the processor, the payment has been made; and
    responsive to a fourth determination that the payment has been made, recording, by the processor, the payment in the award tracking database.

10. The computer-implemented method of claim 7, further comprising:
    determining, by the processor, if a status update has been entered in the award tracking database; and
    responsive to a fifth determination that the status update has been entered, updating, by the processor, the status flag to a third color.

11. The computer-implemented method of claim 7 wherein the payment is associated with a patent or patent application.

12. A computer-implemented method for monitoring a company inventor recognition program comprising:
- creating in a memory an award tracking database that includes a plurality of information about an inventor, the inventor's position in an organizational chart, a list of dockets for patent applications and patents of the inventor, a list of payable events for which the inventor is to receive a payment, and an indication when a payment to the inventor has been authorized by a manager;
- creating in the memory a graphical user interface for display of the award tracking database, a payable events report summarizing any awards that have been authorized and due but for which the award has not been paid, and a payment report that is a summary of any payments made to the inventor;
- using a computer connected to a network and having a program in the memory for updating the award tracking database and for displaying the graphical user interface on a display connected to the computer, accessing the award tracking database to determine that the inventor is entitled to a payment but the payment has not been authorized by a manager; and
- responsive to a determination that the payment has not been authorized by the manager, sending the manager an email adapted to allow the manager to authorize the payment directly from the email so that the manager does not have to manually open another application in order to authorize the payment.

13. An apparatus for monitoring a company inventor recognition program comprising:
- a computer connected to a database and to a memory;
- an awards tracking database in the memory that includes a plurality of information about an inventor, the inventor's position in an organizational chart, a list of dockets for patent applications and patents of the inventor, a list of payable events for which the inventor is to receive a payment, and an indication when a payment to the inventor has been authorized by a manager;
- a program in the memory containing a plurality of instructions adapted to cause a processor of the computer to perform steps comprising:
- accessing the award tracking database to determine when an inventor is entitled to a payment but the payment has not been authorized by a manager; and
- responsive to a determination that the inventor is entitled to a payment but the payment has not been authorized by the manager, automatically sending the manager an email adapted to allow the manager to authorize the payment directly from the email so that the manager does not have to manually open another application in order to authorize the payment.

14. The apparatus of claim 13, further comprising:
- displaying a graphical user interface on a display connected to the computer, the graphical user interface adapted to provide a payable events report summarizing any awards that have been authorized and due but for which the award has not been paid, and a payment report that is a summary of any payments made to the inventor.

15. The apparatus of claim 13, further comprising:
- displaying a graphical user interface on a display connected to the computer, the graphical user interface adapted to provide a payable events report summarizing any awards that have been authorized and due but for which the award has not been paid, and a payment report that is a summary of any payments made to the inventor.

16. A program product for monitoring a company inventor recognition program comprising:
- a computer readable medium containing a plurality of instructions adapted to cause a computer connected to a database to perform steps comprising:
- updating an awards tracking database in the memory that includes a plurality of information about an inventor, the inventor's position in an organizational chart, a list of dockets for patent applications and patents of the inventor, a list of payable events for which the inventor is to receive a payment, and an indication when a payment to the inventor has been authorized by a manager;
- accessing the award tracking database to determine when an inventor is entitled to a payment but the payment has not been authorized by a manager; and
- responsive to a determination that the inventor is entitled to a payment but the payment has not been authorized by the manager, automatically sending the manager an email adapted to allow the manager to authorize the payment directly from the email so that the manager does not have to manually open another application in order to authorize the payment.

\* \* \* \* \*